UNITED STATES PATENT OFFICE.

FRITZ HOYLER, ARTHUR L. GARDNER, AND HANS FOERSTERLING, OF PERTH AMBOY, NEW JERSEY, ASSIGNORS TO THE ROESSLER & HASSLACHER CHEMICAL CO., OF NEW YORK, N. Y., A CORPORATION OF NEW YORK.

TREATING MOTHER-LIQUORS FORMED IN MAKING ALKALI PERBORATES.

1,046,594.     Specification of Letters Patent.     Patented Dec. 10, 1912.

No Drawing.     Application filed May 27, 1910. Serial No. 563,777.

*To all whom it may concern:*

Be it known that we, FRITZ HOYLER and ARTHUR L. GARDNER, both citizens of the United States, and HANS FOERSTERLING, a subject of the Emperor of Germany, residing at Perth Amboy, in the county of Middlesex and State of New Jersey, have invented certain new and useful Improvements in Treating Mother-Liquors Formed in Making Alkali Perborates, of which the following is a specification.

This invention relates to a process of treating mother liquors formed in making alkali perborates.

Liebknecht in his United States Patent No. 842,470 has described a process for making sodium perborate based on the following equation:

$$Na_2B_4O_7 + 4Na_2O_2 + 3CO_2 = 4NaBO_3 + 3Na_2CO_3.$$

In carrying out Liebknecht's process all the alkali carbonate formed is lost in the mother liquor, in addition to the loss of from 20 to 25% of the borax used. We have discovered a way of avoiding the loss of these mother liquors by rendering them available again for the manufacture of alkali perborates, whereby this manufacturing process is made much more economical in practice than heretofore.

According to our process we take the mother liquors of a charge of alkali perborate made from borax and alkali peroxid and carbonic acid, for example, as in the Liebknecht process mentioned above, and boil the same down until part of the alkali carbonate contained in the mother liquors is precipitated, keeping enough of it in solution however so that when colemanite or other boron containing mineral is added, it is converted into borax, the borax being utilized to make alkali perborate as in the Liebknecht process mentioned above. The basis of the process is the reaction taking place when colemanite is treated directly with soda thus generating borax, but various conditions of concentration and solubility play a great part and create a situation very much different from that prevalent, for example, in the art of manufacturing borax from borates of lime and soda.

The principles of our invention may be expressed by the following equations:

$$2Ca_2B_6O_{11} + 3Na_2CO_3 + H_2O = 3Na_2B_4O_7 + 3CaCO_3 + Ca(OH)_2.$$

$$3Na_2B_4O_7 + 12Na_2O_2 + 9CO_2 = 12NaBO_3 + 9Na_2CO_3.$$

In order to more fully explain our invention we will give an example of one means of carrying out the process.

2000 lbs. of mother liquors of the character described containing about 168 lbs. of $Na_2CO_3$ and about 12 lbs. of $B_2O_3$, in the form of alkali salts, are evaporated to about 50° Baumé and the precipitated $Na_2CO_3$, weighing about 112 lbs. when dry, is separated by means of a centrifuge. The remaining liquor is then diluted until it weighs about 900 lbs. and heated while about 80 lbs. of 100% colemanite or its equivalent is added under stirring. After the conversion is complete the mass is passed through a filter-press whereby the calcium compounds are separated out and the resulting liquor diluted with water. The solution of borax thus formed, it is obvious, is ready for the next step of the process in making alkali perborates. This indicates that 6 molecules of sodium carbonate of the total of 9 formed during the process of making sodium perborate are eliminated by evaporation and the remaining 3 are used for the conversion of colemanite into borax.

It will be seen from the foregoing description that our process represents a cycle which has the following advantages: the crystallization of borax, an expensive operation, especially in summertime, is eliminated: no alkali is wasted because the alkali contained in the alk. peroxid is used for the conversion of colemanite into borax: the excess of alkali is recovered in the form of alkali carbonate: all the $B_2O_3$ contained in the mother liquors of the perborate manufactured, amounting to 20 to 25%, is recovered without the necessity of crystallizing out the same.

Of course it is to be understood that we do not limit ourselves to the process as described, as other boron containing minerals than colemanite can be used Instead of converting colemanite into borax we could convert the same into alkali metaborate by using an excess of alkali carbonate, the metaborate afterward to be converted into perborate.

What we desire to claim is:

1. The method of treating mother liquors containing alkali carbonate formed in making alkali perborates which consists in concentrating the same, precipitating out part of the alkali carbonate contained therein, diluting the remaining liquor and adding a mineral consisting essentially of an alkali earth borate.

2. The method of treating mother liquors containing alkali carbonate formed in making alkali perborates which consists in concentrating the same, precipitating out part of the alkali carbonate contained therein, diluting the remaining liquor and adding colemanite.

3. The method of treating mother liquors containing alkali carbonate formed in making alkali perborates which consists in concentrating the same, precipitating out part of the alkali carbonate contained therein, diluting the remaining liquor, adding a mineral consisting essentially of an alkali earth borate to the solution, thereby converting the latter by means of the alkali compound into an alkali boron compound and an insoluble compound and then separating out the insoluble compound.

4. The method of treating mother liquors containing alkali carbonate formed in making alkali perborates which consists in concentrating the same, precipitating out part of the alkali carbonate contained therein, diluting the remaining liquor, adding colemanite to the solution, converting the latter by means of the alkali compound into an alkali boron compound and an insoluble compound and then separating out the insoluble compound.

In testimony whereof we have signed this specification in the presence of two subscribing witnesses.

FRITZ HOYLER.
ARTHUR L. GARDNER.
HANS FOERSTERLING.

Witnesses:
HERBERT PHILIPP,
L. M. ROSSI.